June 17, 1969

D. D. CALL 3,449,963

GYROSCOPE DRIVE SUPPORT MECHANISM

Filed Sept. 29, 1965

Inventor:
Daniel D. Call.

By Griffin and Branigan
Attys 3,449,963
GYROSCOPE DRIVE SUPPORT MECHANISM
Daniel D. Call, Mount Prospect, Ill., assignor to Bell & Howell Company, Chicago, Ill., a corporation of Illinois
Filed Sept. 29, 1965, Ser. No. 491,212
Int. Cl. G01c 19/06
U.S. Cl. 74—5.7
8 Claims

ABSTRACT OF THE DISCLOSURE

There is herein disclosed a friction erection drive mechanism for a gyroscope rotor wherein the rotor is driven by means of a spherically surfaced element which is mounted on the output end of a motor's drive shaft. The other end of the motor's drive shaft is mounted in a bearing assembly which, aside from the driving member's contact with the rotor, is the only support for the drive shaft. In this manner, the drive shaft is effectively suspended between only the spin stabilized rotor on one end and of the single bearing assembly on its other end.

---

This invention relates to gyroscopes and more particularly to an improved supporting structure for a gyroscope drive mechanism.

One quite satisfactory method for stabilizing an element in space is to connect it either electrically or mechanically to a gyro rotor which is relatively spacially stable. Sometimes, the spin stabilized rotor is mounted in a gimbal suspension system which forms a part of an instrument housing within which both the gyro and the thusly stabilized element may be housed. Other times the rotor is merely mounted on a rapidly rotated spherical element positioned at the rotor's center. The rotor is then spun about a spin axis by the frictional forces between it and the surface of the sphere. In this manner, although the rotor is spun about its spin axis by the sphere, it is nevertheless free to move about the spherical surface so that its spin axis diverges from the sphere's drive axis. A spherical driving element of this type is more fully described in U.S. Patent 2,815,584 entitled "Gyro Combining Limited Freedom and Angular Rater Sensitivity," to J. R. Watson which issued in December of 1957. In still other cases, as in a preferred embodiment of the instant invention which will be described shortly, the rotor is both spherically driven and gimbal suspended.

In the past, the Watson type of spherically surfaced rotor drive mechanisms have been rotatably mounted in bearings. That is, the spherical drive surface has been placed on one end of a drive shaft which is in turn rotatably mounted between two sets of bearings that are spaced apart along the axis of the drive shaft. Hence, when a spherically driven rotor has been used in an instrument, the drive shaft bearings have been conveniently affixed to the instrument housing. When these gyroscopic stabilization devices are intended to be used in mass production, however, the above described structures for mounting the spherical surface's drive shaft have been quite unsatisfactory. This is because any misalignment between the drive shaft and the gimbal suspension system associated with the rotor introduces undesirable forces on the rotor and its gimbal system whereby the rotor has a strong tendency to wobble and nutate.

One past solution has partially solved the nutation problem. That has been to precision grind and lap the drive shaft and mount it in a matched set of micro-aligned bearings. This solution, however, is not compatible with a commercially mass produced instrument. Another means for avoiding the nutation problems caused by even slight drive shaft misalignment would appear to be to join the drive shaft to the spherical driving element by means of a flexible coupling such as, for example, a rubber sleeve. This, however, permits a whipping action in the sphere's drive shaft which also causes nutation of the rotor.

It is an object of this invention, therefore, to provide a means for supporting a rotor's driving shaft in a manner whereby the rotor is substantially free of nutational tendencies caused by minor misalignments of the drive shaft with respect to the axis of the rotor.

When a rotor is freely suspended on the end of a spherically surfaced driving element the above described nutational tendencies, although present, are not as great as when the rotor is rotatably mounted within a gimbal suspension system. In this latter case, the spherical surface's drive shaft must not only be axially aligned with the rotor, but it must also be aligned with an axis of the gimbal suspension system. Hence, it is a more specific object of the invention to provide a means for supporting the drive shaft of a spherically driven, gimballed rotor.

In accordance with the principle of the invention, a drive shaft has a spherically surfaced driving member mounted on one end thereof with the driving member located at the center of a spin stabilized rotor. The other end of the drive shaft is rotatably mounted in a bearing assembly which, aside from the driving member's contact with the rotor, is the only support for the drive shaft. In this manner, the drive shaft is effectively suspended between only the spin stabilized rotor on its one end and the single bearing assembly on its other end. I have discovered, contrary to prior concepts, that a thusly supported drive shaft not only enables the rotor to be substantially free of a tendency to nutate, but eliminates the previously prohibitively expensive micro-aligning techniques that have been required in the past.

An additional advantage of the instant invention is that because the runout of the driving sphere with respect to the rotor's axis has been substantially eliminated, the driving sphere itself can be manufactured with relatively high tolerances and therefore manufactured at a lesser expense than prior art devices.

The foregoing and other objects, features, and advantages of the invention will be apparent from the following more particular description of preferred embodiments thereof, as illustrated in the accompanying drawings wherein the same reference numerals refer to the same parts throughout the various views. The drawings are not necessarily intended to be to scale, but rather are presented so as to illustrate the basic principles of the invention in clear form.

Figure 1:
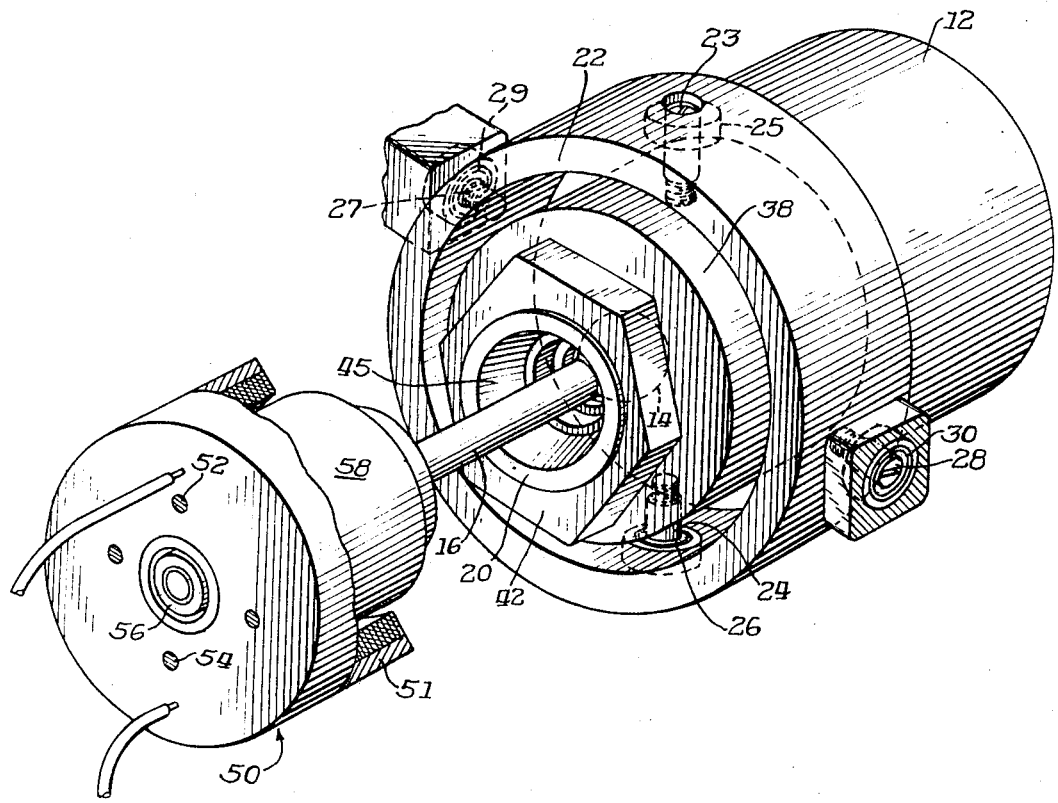
FIG. 1 is a perspective view of a gyroscopic stabilization mechanism incorporating a preferred embodiment of the invention.

Referring now to the drawings, a preferred embodiment of the invention will be described.

Figure 2:
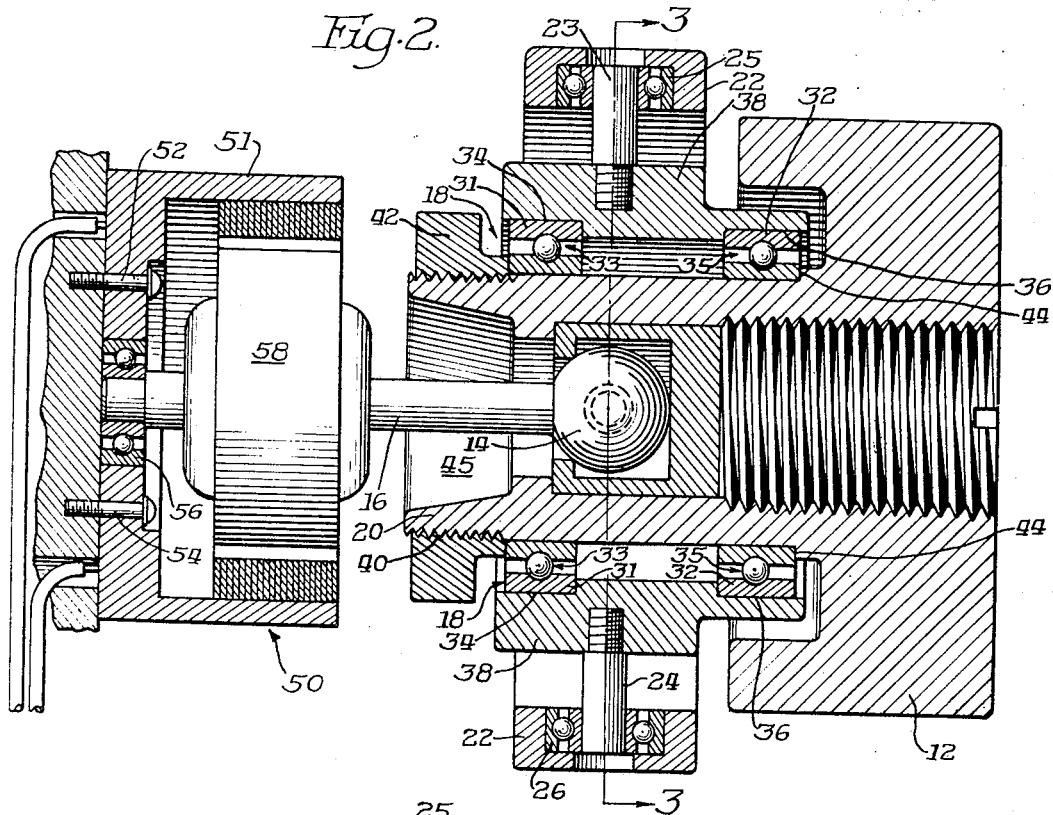
FIG. 2 is an enlarged vertical sectional view taken along the axis of the rotor in FIG. 1.
Figure 3:
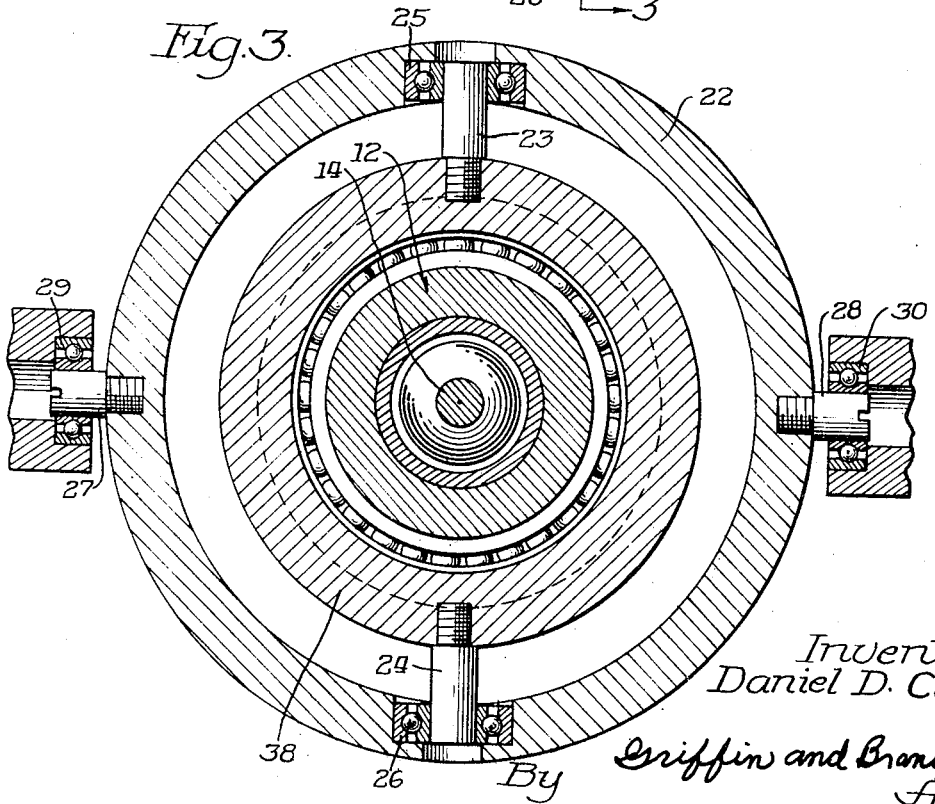
FIG. 3 is a sectional view of the invention shown in FIG. 1 taken along the lines 3—3 in FIG. 2.

In FIG. 1 a rotor 12 is driven by an internally located spherical ball 14 which is affixed to the end of a driving shaft 16. The rotor is free to spin about its axis within a bearing assembly 18 (FIG. 2) which surrounds a rotor support arm 20. The bearing assembly 18 is pivotally mounted in a gimbal ring 22 by means of gimbal pins 23 and 24 which are mounted in bearing assemblies 25 and 26 of the gimbal ring 22 (FIGS. 2 and 3). The gimbal ring 22 is in turn pivotally mounted with respect to the instrument housing (not shown) in which the device of the invention is located. This pivotal mounting of the gimbal ring 22 is accomplished by means of gimbal pins 27 and 28 which are affixed at one of their ends to the gimbal ring and have the other ends thereof mounted in bearing assemblies 29 and 30 of the instrument housing. In this manner, the rotor 12 is pivotable about the horizontal axis defined by the gimbal pins 27 and 28 and also about the vertical axis defined by the gimbal pins 23 and 24.

As shown in FIG. 2, the rotor support arm 20 extends to the left through a central opening in the bearing assembly 18. The outer races 31 and 32 of a set of bearings are pressed into recesses 34 and 36 of a bearing block 38 which comprises the bulk of the bearing assembly 18. The inner races of bearing assemblies 33 and 35 are pressed onto the rotor support arm 20. The left end of the support arm is threaded at 40 to receive a retaining nut 42. The retaining nut is fastened so that it and a shoulder 44 on the rotor 12 are snugged up against the inner races of the bearing assemblies 33 and 35 respectively. The rotor therefore, is rotatable about an axis through the center of the main bearing assembly 18. This axis is referred to as the rotor's spin axis. With respect to the instrument housing, therefore, the rotor is free to both spin about its spin axis and move in pitch and yaw about the axes defined by the gimbal pins. This relative motion of the rotor may then be transmitted to an element which it is desired to stabilize, such as a lens element of a camera, for example, by means of either a suitable linkage system connected to the main bearing block, a selsyn sensing device, or some other similarly suitable system.

In FIGS. 1 and 2 the shaft 16 extends from the left into a relatively wide central opening 45 of the rotor support arm 20. The driving sphere 14, mounted on the end of the shaft 16, is located in the center of the rotor support arm and has its own center substantially in the plane defined by the above described gimbal pins. The drive shaft 16 comprises a shaft of a motor 50 which has the stator portion 51 thereof affixed to the instrument housing by means of suitable fastening devices such as screws 52 and 54. The left end of the shaft 16 is rotatably mounted in the motor's stator in a bearing assembly 56. The motor's rotor portion 58 is mounted on the drive shaft 16 as shown in FIG. 2. It should be particularly noted that contrary to what one might expect to find, there is no shaft bearing assembly to the right of the motor's rotor 58. It is by eliminating this normal bearing assembly that the objects of the invention are obtained. That is, with the normal bearing assembly removed, there has also been an elimination of the wobble and nutation caused by misalignment between it, the bearing assembly 56, and the axis of the rotor 12.

The above described structure, therefore, provides a means for supporting a spherical drive member's drive shaft in a manner whereby the driven rotor is substantially free of nutational tendencies. Moreover, even though the stabilized rotor is gimbal suspended the rotor is still substantially free of nutational tendencies notwithstanding the introduction of additional misalignments between the drive shaft's single support bearing and the gimbal suspension system. One reason for this latter misalignment's failure to cause the rotor to nutate might be that the misalignment merely causes the instantaneous axis of the rotor to be very slightly offset. The slight offset, however, is so slight as to be all but unnoticeable in the operation of the thusly stabilized instrument as compared to the intolerable nutation that a similar misalignment introduces into prior art devices.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. In a driving mechanism for a gyroscope rotor of the type in which the rotor is mounted on a spherically surfaced driving member and driven by frictional forces between the rotor and said spherically surfaced driving member, the combination comprising:
   a drive shaft having said spherically surfaced drive member disposed on one end thereof;
   means to rotate said drive shaft;
   and a bearing having the other end of said drive shaft rotatably mounted therein so that the only support for said drive shaft is said rotor at one end and said bearing at the other end.

2. The apparatus of claim 1 wherein said rotor is rotatably mounted within a gimbal suspension system.

3. In a driving mechanism for a gyroscope rotor of the type in which the rotor is mounted on a spherically surfaced driving member and driven by frictional forces between the rotor and said spherically surfaced driving member, the combination comprising:
   a bearing assembly;
   a motor having one end of the drive shaft thereof rotatably mounted in said bearing assembly;
   and wherein said spherically surfaced driving member is disposed on the other end of said drive shaft so that the only support for said drive shaft is said bearing at one end and said rotor at the other end.

4. The apparatus of claim 3 wherein said rotor is rotatably mounted within a gimbal suspension system.

5. In a driving mechanism for a gyroscope rotor of the type in which the rotor is mounted on a spherically surfaced driving member and driven by frictional forces between the rotor and said spherically surfaced driving member, the combination comprising:
   a rotatably driven drive shaft having said spherically surfaced drive member disposed on one end thereof;
   and a support means for said drive shaft, said support means consisting of:
   a bearing located at the other end of said drive shaft and the rotor disposed on the spherically surfaced drive member.

6. The apparatus of claim 1 wherein said rotor is rotatably mounted within a gimbal suspension system.

7. In a gyro stabilized instrument having a driving mechanism for a gyroscope rotor of the type in which the rotor is mounted on a spherically surfaced driving member and driven by frictional forces between the rotor and said spherically surfaced driving member, the combination comprising:
   a housing for said instrument;
   a gimbal suspension system mounted within said instrument housing;
   said rotor being rotatably mounted within said gimbal suspension system;
   a motor having a stator assembly thereof affixed to said instrument housing;
   a bearing affixed to said stator assembly;
   and a drive shaft of said motor having said spherically surfaced driving member disposed on one end thereof, said drive shaft being rotatably suspended between said bearing assembly at the other end thereof and said rotor disposed on the spherically surfaced driving member.

8. In a gyro stabilized instrument having a driving mechanism for a gyroscope rotor of the type in which the rotor is mounted on a spherically surfaced driving member and driven by frictional forces between the rotor and said spherically surfaced driving member, the combination comprising:
- a housing for said instruments;
- a gimbal suspension system mounted within said instrument housing, said rotor being rotatably mounted within said gimbal suspension system;
- a motor having a stator assembly thereof affixed to said instrument housing;
- a bearing affixed to said stator assembly;
- a drive shaft of said motor having said spherically surfaced driving member disposed at one end thereof;
- and a support means consisting of said bearing assembly located at the other end of said drive shaft and said rotor disposed on the spherically surfaced drive member.

References Cited

UNITED STATES PATENTS

| 1,860,230 | 5/1932 | Brown | 64—30 |
| 1,924,037 | 8/1933 | Henderson | 33—204.15 |
| 2,815,584 | 12/1957 | Watson | 74—5.7 |

FOREIGN PATENTS

| 570,366 | 1957 | Italy. |

C. J. HUSAR, *Primary Examiner.*